(12) United States Patent
Park

(10) Patent No.: US 6,460,532 B1
(45) Date of Patent: Oct. 8, 2002

(54) DIAMOND CUTTING WHEEL

(75) Inventor: Kuk Seob Park, Incheon (KR)

(73) Assignee: Shinhan Diamond Industrial Co. Ltd., Namdong-Gu Incheon Ko (KR)

( * ) Notice: Subject to any disclaimer, the term of this patent is extended or adjusted under 35 U.S.C. 154(b) by 0 days.

(21) Appl. No.: 09/699,740

(22) Filed: Oct. 30, 2000

(30) Foreign Application Priority Data

Jul. 5, 2000 (KR) ........................................ 2000-38330

(51) Int. Cl.$^7$ ................................................. B28D 1/04
(52) U.S. Cl. ........................ 125/13.01; 125/15; 125/22; 451/540; 451/548; 83/835
(58) Field of Search ................ 125/12, 13.01, 125/15, 18, 22, 28; 83/835; 451/540, 548

(56) References Cited

U.S. PATENT DOCUMENTS

| | | | | |
|---|---|---|---|---|
| 4,267,814 A | * | 5/1981 | Benson et al. ................ | 125/15 |
| 4,982,720 A | * | 1/1991 | Matsuda ....................... | 125/15 |
| 5,392,759 A | * | 2/1995 | Kwang ......................... | 125/15 |
| 5,471,970 A | * | 12/1995 | Sakarcan ...................... | 125/15 |
| 5,518,443 A | * | 5/1996 | Fisher .......................... | 125/15 |
| 5,839,423 A | * | 11/1998 | Jones et al. ................... | 125/15 |

* cited by examiner

*Primary Examiner*—M. Rachuba
(74) *Attorney, Agent, or Firm*—Ladas & Parry

(57) ABSTRACT

A diamond cutting wheel is disclosed. The cutting wheel is capable of reducing frictional resistance, maximizing cutting efficiency, preventing the formation of chippings and discharging cut chips effectively, by means of a plurality of depressions formed on its cutting tip and the continued cutting surfaces of the cutting tip. The cutting wheel comprises a core disk and a sintered cutting tip. The sinter is fitted around and welded to the circumferential end of the core disk. A plurality of depressions are formed on the upper and lower cutting surfaces of the cutting tip while being spaced apart from one another. The depressions formed on the upper cutting surface alternate with the depressions formed on the lower cutting surface so as to allow the cutting surfaces to be continued.

2 Claims, 8 Drawing Sheets

PRIOR ART

DIAMOND CUTTING WHEEL

BACKGROUND OF THE INVENTION

1. Field of the Invention

The present invention relates, in general, to a diamond cutting wheel and, more particularly, to a diamond cutting wheel, which is capable of reducing frictional resistance, maximizing cutting efficiency, preventing undesirable chippings from being formed on the cut surface of the workpiece and allowing cut chips to be discharged effectively, by means of a plurality of depressions formed on its cutting tip and the continued cutting surfaces of the cutting tip.

2. Description of the Prior Art

In general, a diamond cutting wheel used to cut stone workpieces, such as structural and engineering asphalt, ash concrete or green concrete, is fabricated by welding a continuously formed cutting tip, which is formed by mixing diamond powder and metallic powder and sintering the mixture, along the circumferential edge of a core disk.

When such a diamond cutting wheel begins to cut a workpiece, the cutting tip of the diamond cutting wheel is brought into contact with the workpiece completely because the cutting tip is continuously formed in the shape of a ring, thereby improving the cutting efficiency of the cutting wheel.

In the utilization of the diamond cutting wheel, when the diamond cutting wheel cuts a workpiece while being rotated at a low speed, frictional resistance exerted on the cutting wheel from the workpiece is small, thereby improving the cutting efficiency of the cutting wheel.

On the other hand, when the diamond cutting wheel cuts a workpiece while being rotated at a high speed, frictional resistance exerted on the cutting wheel is large, thereby deteriorating the cutting efficiency of the cutting wheel.

In other words, when the diamond cutting wheel cuts a workpiece at a high rotating speed, load exerted on the cutting wheel is enlarged and the cutting efficiency of the cutting wheel is lowered because frictional resistance exerted on the cutting wheel is enlarged.

In order to overcome the shortcomings of the conventional diamond cutting wheel, cutting wheels of various shapes have been proposed. FIG. 1 discloses a diamond cutting wheel in which a plurality of separating slots 12 are radially formed on the circumferential end of a core disk 10 and a plurality of cutting tip segments 20' fabricated by mixing diamond powder and metallic powder and sintering the mixture are welded to the circumferential edge of the core disk 10 separated by the separating slots 12.

In the case of this conventional diamond cutting wheel, since the cutting tip segments 20' are separated, that is, a gap 2 is formed between each two neighboring cutting tip segments 20', the contact surface between the cutting wheel and a workpiece is reduced while the cutting wheel cuts the workpiece, thereby reducing load exerted on the cutting wheel and improving the cutting efficiency of the cutting wheel.

However, the side edges of the cutting tip segments 20' are sharp, so that the side edges generate chippings on the cut surfaces of the workpiece and cause the cutting tips segments 20' to be damaged by the workpiece.

In FIG. 2, there is depicted another diamond cutting wheel in which a cutting tip 20" is welded to the circumferential edge of a core disk 10 and a plurality of depressions 3 are formed along the cutting tip 20" while being regularly spaced from one another. In comparison with the diamond cutting wheel of FIG. 2, this diamond cutting wheel has a superior strength because the cutting tip 20" is fabricated in the form of a single body. However, since the cutting surfaces of the cutting tip 20" brought into contact with a workpiece are divided into a plurality of segments by the depressions 3 and the sharp edges of the cutting tip 20" are formed, there still exists a shortcoming in which chippings are generated on the cut surfaces of the workpiece.

In addition, in the proposed diamond cutting wheels of FIGS. 1 and 2, the separating slots 12 and the depressions 3 are designed to discharge cut chips, but the cut chips are not discharged well through the separating slots 12 or the depressions 3 because the cut chips are easily removed from the separating slots 12 or the depressions 3 by centrifugal force generated by the rotating cutting wheel, thereby hindering the cutting operation of the cutting wheel. Accordingly, the cutting efficiency of the cutting wheel cannot be maximized.

Furthermore, in the proposed diamond cutting, since the radially inner portions of the cutting tip segments 20' and the radially inner portion of the cutting tip 20" are respectively and simply fitted around and welded to the circumferential ends of the core disks 10 while being overlapped with the circumferential ends of the core disks 10, the cutting tip segments 20' and the cutting tip 20" may be easily removed from the core disks 10 and, particularly, the possibility of the removal of the cutting tip segments 20' and the cutting tip 20" is maximized. As a result, the strength of the cutting wheel is relatively low, the life span of the cutting wheel is relatively short, and a user may be damaged by the scattering of the broken pieces of the cutting tip segments 20' or the cutting tip 20".

Additionally, in the proposed diamond cutting wheels, since the core disk 10 is fabricated in the form of a flat plate, the core disk 10 may be easily deformed by the stress exerted while the cutting wheel cuts a workpiece. Accordingly, precise cutting is not secured by such conventional diamond cutting wheels.

In the meantime, Korean Patent Publication No. 98-19334 discloses a diamond cutting wheel in which a plurality of corrugations are radially formed on a core disk to be extended from the center of the core disk to the circumference of the core disk in order to reinforce the core disk. Since the corrugations are merely radially formed on a core disk, the strength of the core disk is insufficient for various stresses, such as a twisting stress, that is generated while the cutting wheel cuts a workpiece. Accordingly, the cutting wheel has a disadvantage of not being reinforced sufficiently.

SUMMARY OF THE INVENTION

Accordingly, the present invention has been made keeping in mind the above problems occurring in the prior art, and an object of the present invention is to provide a diamond cutting wheel, which is capable of not only reducing frictional force exerted on the cutting wheel due to the frictional resistance produced by a workpiece, but also preventing chippings from being generated on the cut surfaces of the workpiece and maximizing the cutting efficiency of the cutting wheel.

Another object of the present invention is to provide a diamond cutting wheel, which is capable of performing cutting work effectively by the discharge of the cut chips produced while the cutting wheel cuts a workpiece.

A further object of the present invention is to provide a diamond cutting wheel, which is capable of preventing its cutting tip from being removed and damaged during its cutting work by the secure engagement of the cutting tip with the core disk, thereby improving the sturdiness of the cutting wheel and maximizing the safety of the cutting wheel.

Yet another object of the present invention is to provide a diamond cutting wheel, which has a strength to prevent the core disk from being deformed by stresses of various directions, thereby lengthening the life span of the cutting wheel and allowing the cutting wheel to cut a workpiece precisely.

In order to accomplish the above object, the present invention provides a diamond cutting wheel, comprising a core disk and a sintered cutting tip fitted around and welded to the circumferential end of the core disk, wherein a plurality of depressions are formed on the upper and lower cutting surfaces of the cutting tip while being spaced apart from one another, the depressions formed on the upper cutting surface alternating with the depressions formed on the lower cutting surface so as to allow the cutting surfaces to be continued.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
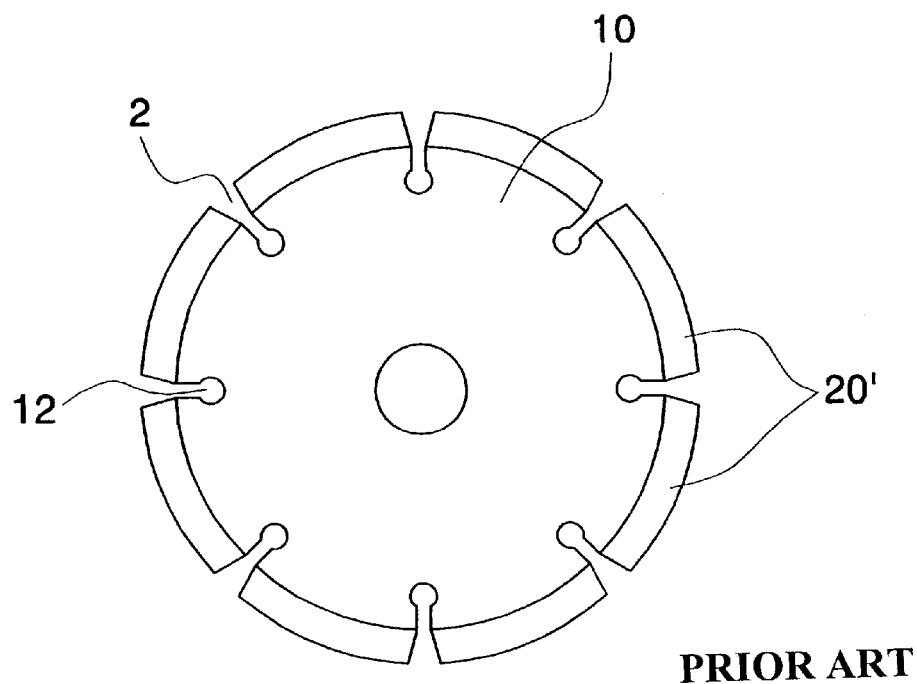
FIG. 1 is a plan view showing a conventional diamond cutting wheel.
Figure 2:
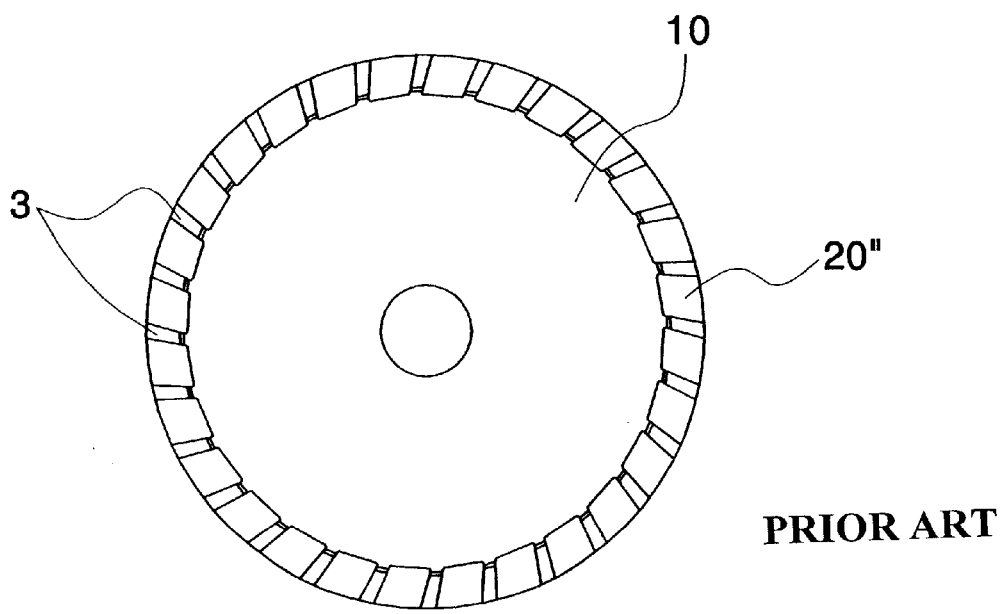
FIG. 2 is a plan view illustrating another conventional diamond cutting wheel.
Figure 3:
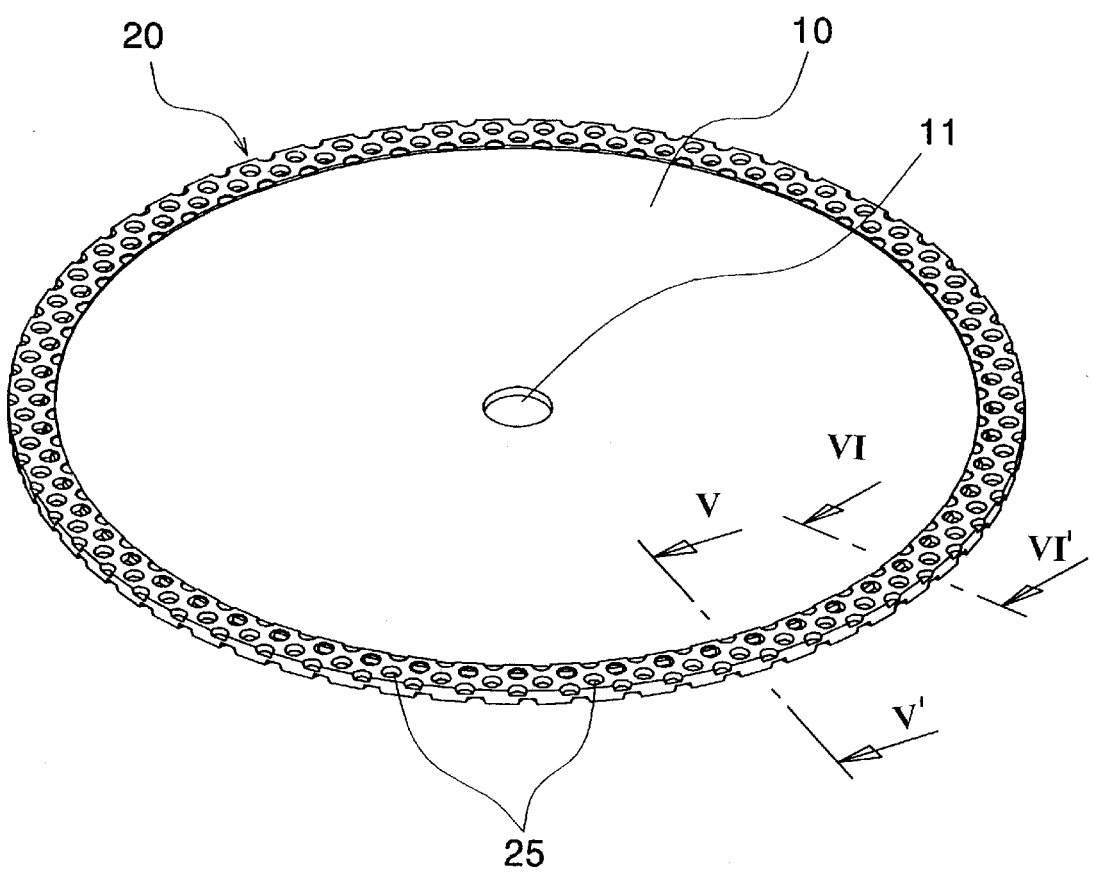
FIG. 3 is a perspective view showing a diamond cutting wheel in accordance with an embodiment of the present invention.
Figure 4A:
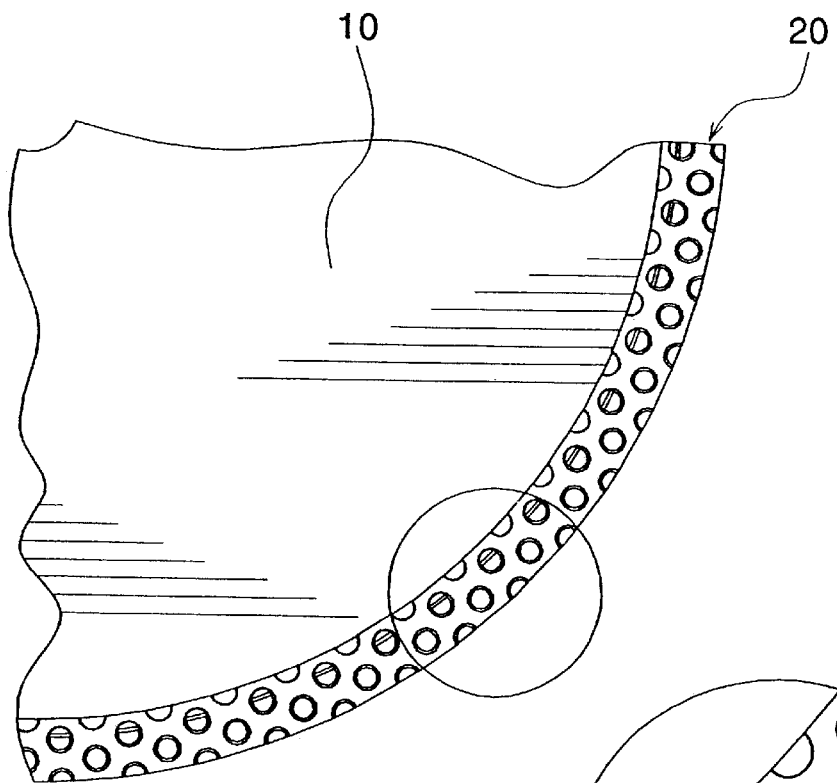
FIGS. 4A and 4B are, respectively, a fragmentary view and a partially enlarged view showing the important portion of the diamond cutting wheel of the present invention.
Figure 4B:
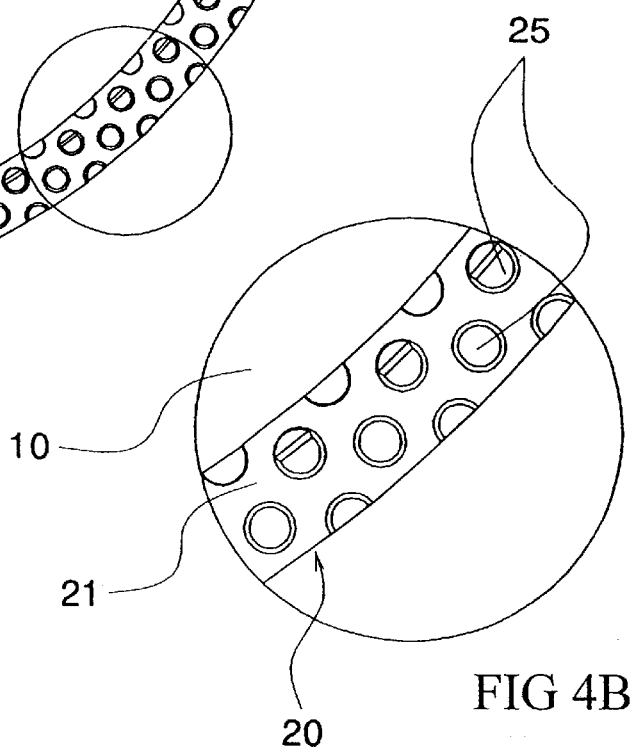
Figure 5:
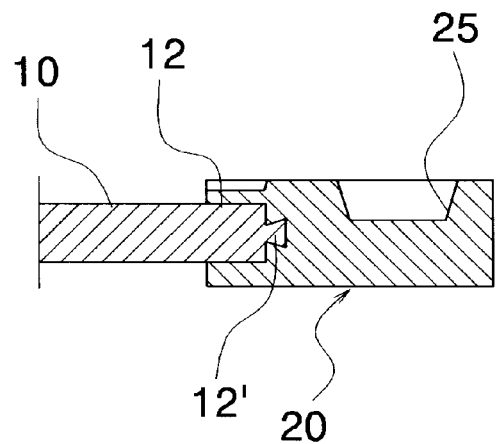
FIG. 5 is a sectional view taken along line V–V' of FIG. 3.
Figure 6:
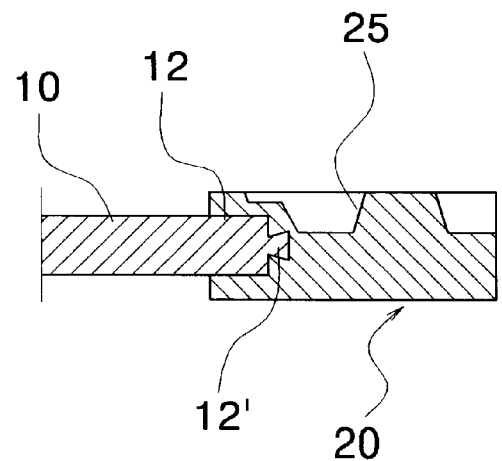
FIG. 6 is a sectional view taken along line VI–VI' of FIG. 3.
Figure 7:
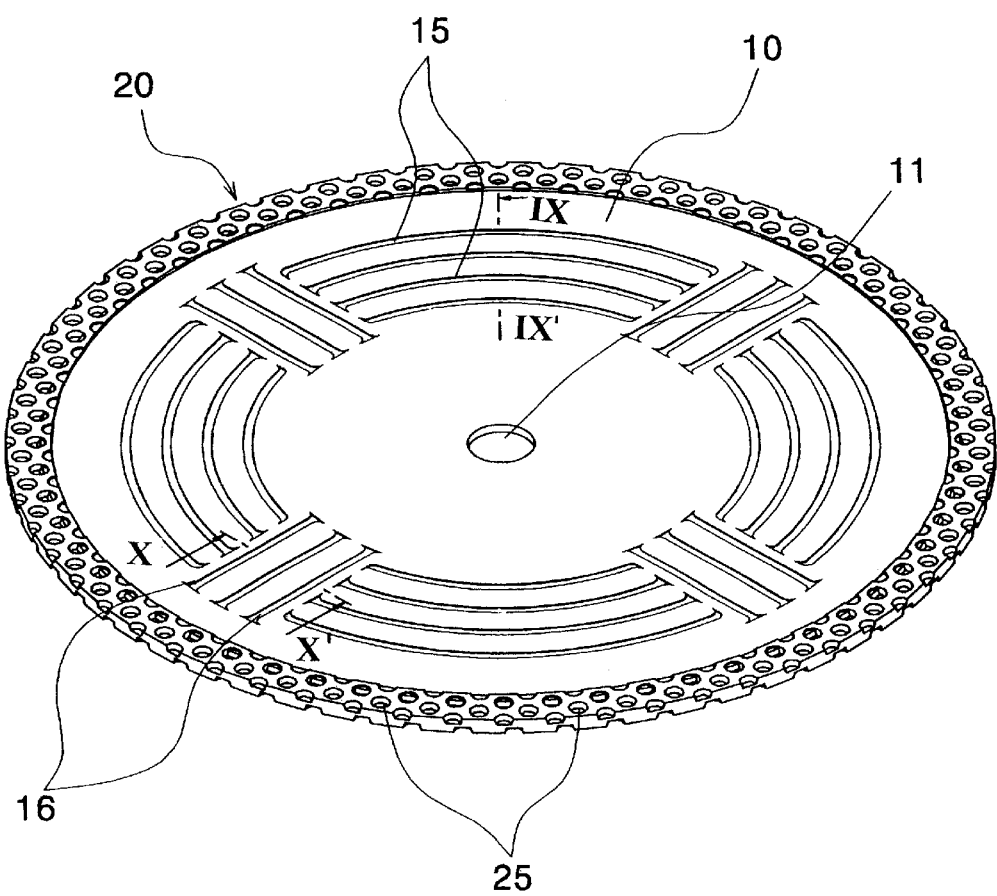
FIG. 7 is a perspective view showing a diamond cutting wheel in accordance with another embodiment of the present invention.
Figure 8:
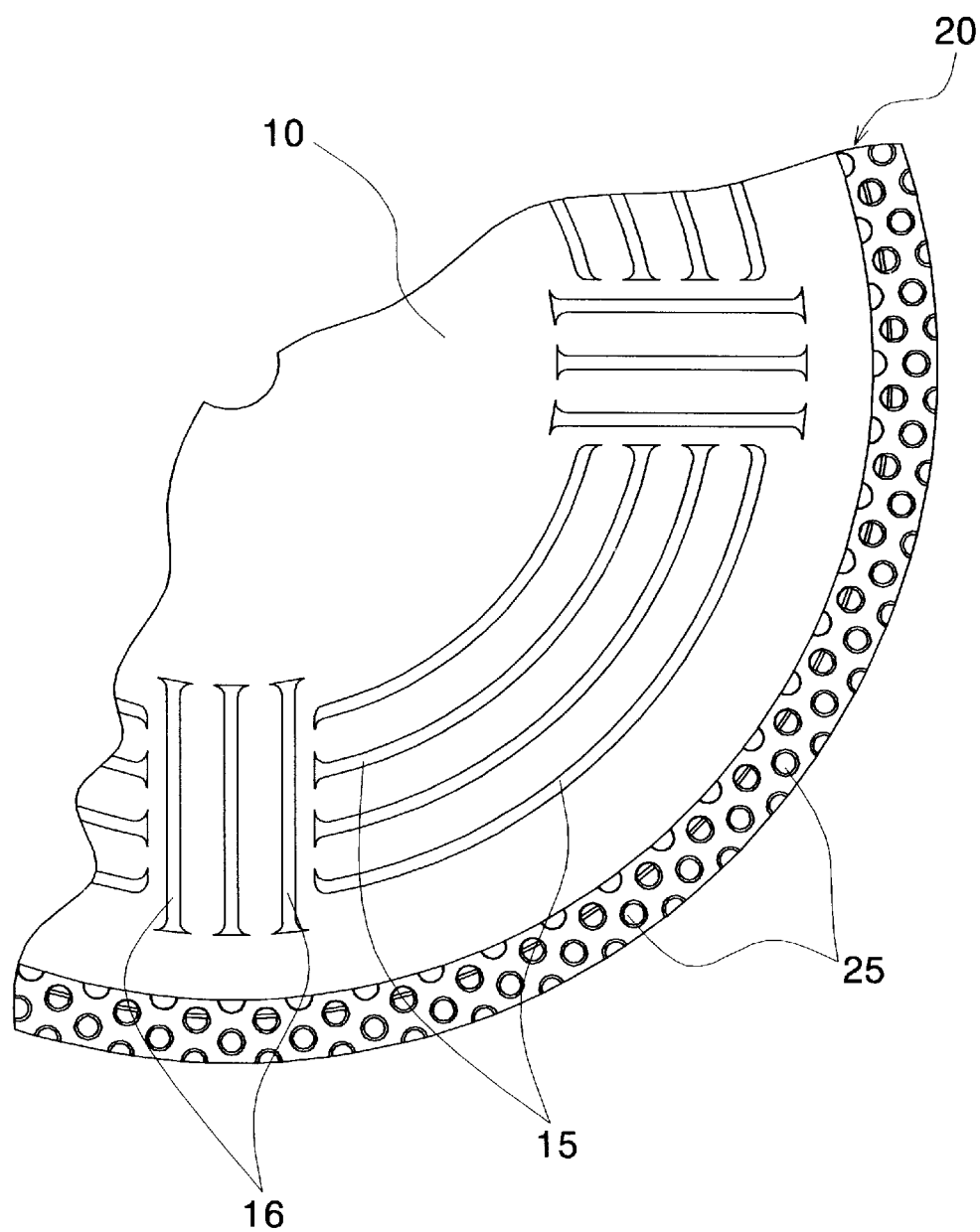
FIG. 8 is a partially enlarged plan view showing the important portion of FIG. 7.
Figure 9:
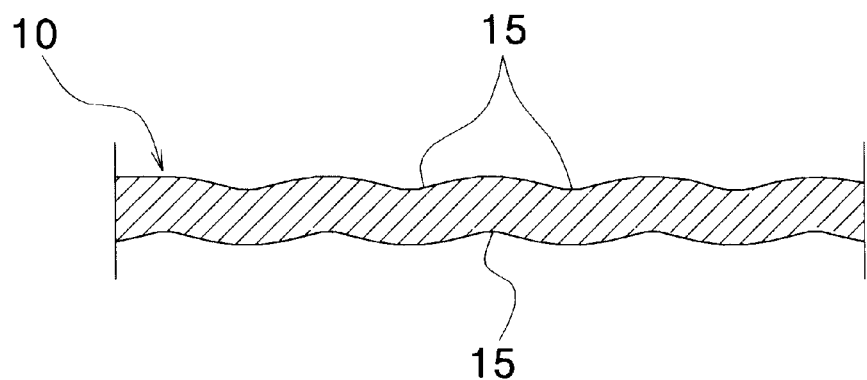
FIG. 9 is a sectional view taken along line IX–IX' of FIG. 7.
Figure 10:
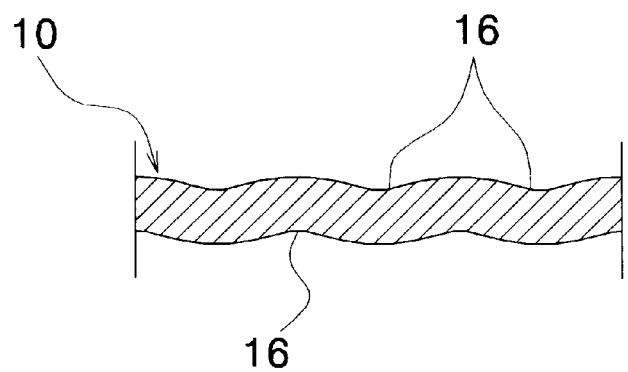
FIG. 10 is a sectional view taken along line X–X' of FIG. 7.

Reference now should be made to the drawings, in which the same reference numerals are used throughout the different drawings to designate the same or similar components.

As illustrated in FIGS. 3 to 6, a diamond cutting wheel according to an embodiment of the present invention comprises a core disk 10 and a sintered cutting tip 20. The cutting tip 20 is fitted around and welded to the circumferential end of the core disk 10.

A plurality of depressions 25 are formed on the upper and lower cutting surfaces 21 of the cutting tip 20 while being equidistantly spaced apart from one another, the depressions 25 formed on the upper cutting surface alternating with the depressions 25 formed on the lower cutting surface so as to allow the cutting surfaces 21 to be continued.

In this case, each of the depressions 25 is preferably formed to have a circular shape. Of course, each depression may be formed to have one of various shapes, such as an elliptic, triangular, square or lozenge shape. It should be understood that the alteration of the shape of the depression does not depart from the scope and spirit of the present invention.

A ring-shaped engaging projection 12' having a trapezoidal cross section is formed along the outer edge of the circumferential end of the core disk 10, and is inserted into the inner circumferential edge of the cutting tip 20.

Reference numeral 11 designates a shaft hole.

Figure 11:
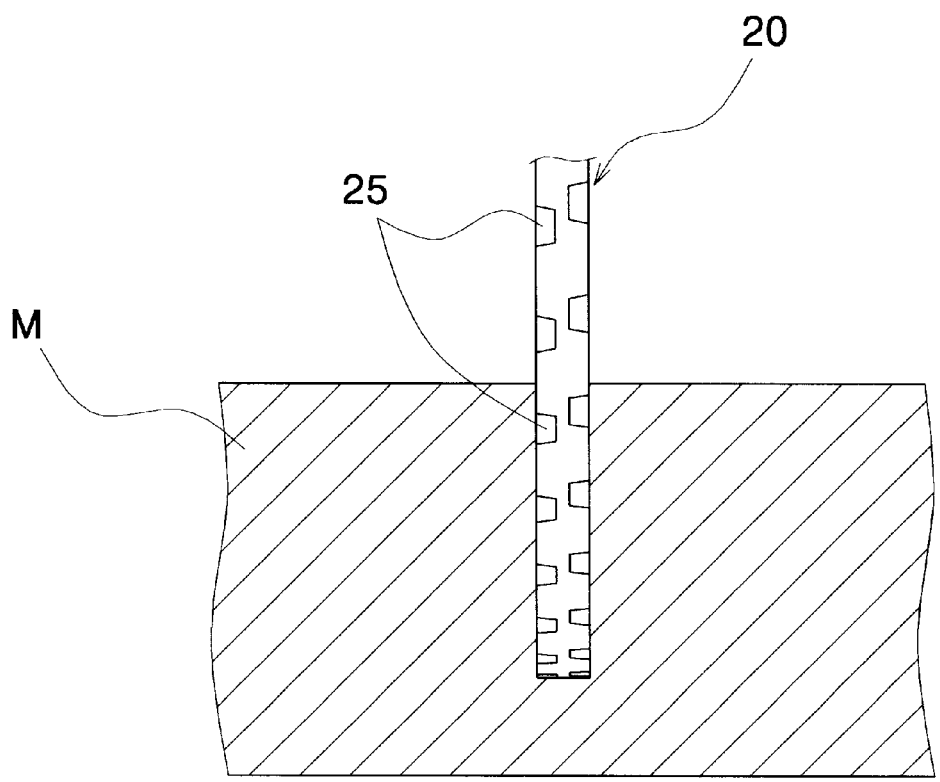
FIG. 11 is a partially sectional view showing the cutting operation of the diamond cutting wheel of the present invention.

As depicted in FIG. 11, the diamond cutting wheel of the present invention cuts a workpiece M while being engaged with a cutting machine (not shown) and being rotated.

In this case, the cutting tip 20 engaged with the circumferential end of the core disk 10 is fabricated to form a single body, so that the deformation and damage of the cutting tip 20 owing to frictional resistance is minimized.

In addition, a plurality of depressions 25 are formed on the cutting surfaces 21 of the cutting tip 20, so that the contact surfaces between the cutting tip 20 and the workpiece are reduced and accordingly frictional resistance between the cutting tip 20 and the workpiece M are reduced, thereby maximizing the cutting efficiency of the cutting wheel and load exerted on the cutting wheel is reduced.

The cutting surfaces 21 of the cutting tip 20 are respectively continued in the form of planes, so that the cutting surfaces 21 are completely in contact with the workpiece M, thus preventing the formation of chippings and improving the cutting efficiency of the cutting wheel. These are all the same in high-speed and low-speed rotations.

The cut chips of the workpiece M are inserted into the depressions 25 of the cutting tip 20 and are prevented from being removed out of the depressions 25 and discharged to the outside, so that hindrance to the cutting work of the cutting wheel is minimized, thus increasing cutting efficiency.

Furthermore, since the engaging projection 12' having a trapezoidal cross section is formed along the outer edge of the circumferential end of the core disk 10 and inserted into the cutting tip 20, the cutting tip 20 maintains a secure engagement with the core disk 10 in spite of stresses of various directions including a twisting stress, thereby preventing the cutting tip 20 from being damaged and removed from the core disk 10.

In the meantime, as illustrated in FIGS. 7 to 10, multiple groups of circumferential corrugations 15 are formed on the radially central portion of a core disk 10 while being equidistantly spaced apart from each other group, and a group of radial corrugations 16 are formed at a position between each two neighboring circumferential corrugations 15.

In accordance with this embodiment, the core disk 10 has strength due to the radial and circumferential corrugations 15 and 16, so that the core disk 10 is prevented from being deformed while cutting the workpiece M.

In more detail, since the circumferential corrugations 15 are extended circumferentially and the radial corrugations 16 are extended radially, the core disk 10 can stand stresses of rotational, radial and other directions and a twisting stress. Accordingly, the core disk 10 can be prevented from being deformed and vibrated.

Heat and cut chips, which are generated during the cutting work of the cutting wheel, can be discharged by generating airflow through the corrugations 15 and 16, so that the cutting efficiency is maximized.

As described above, the present invention provides a diamond cutting wheel, which is capable of reducing frictional resistance and, thereby, reducing frictional surfaces with a workpiece by forming a plurality of depressions on the cutting surfaces of its cutting tip and is capable of preventing the formation of chippings by allowing the cutting surfaces to be respectively continued, thereby maximizing cutting efficiency.

In addition, the present invention provides a diamond cutting wheel, which is capable of preventing the cutting tip from being damaged by satisfactorily discharging cut chips through depressions formed on the cutting tip and securely engaging the cutting tip with the core disk, thereby lengthening the life span of the cutting wheel.

Furthermore, the present invention provides a diamond cutting wheel, which is capable of preventing its core disk from being deformed, cutting a workpiece precisely and discharging cut chips and heat generated during a cutting operation by means of corrugations radially extended and corrugations circumferentially extended on its core disk, thereby maximizing cutting effectiveness.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A diamond cutting wheel, comprising:
   a core disk;
   a sintered cutting tip fitted around and welded to a circumferential end of the core disk;
   a plurality of depressions formed on upper and lower cutting surfaces of the cutting tip while being spaced apart from one another, the depressions formed on the upper cutting surface alternating with the depressions formed on the lower cutting surface so as to allow the cutting surfaces to be continued, wherein each of said depressions is formed to have a circular shape; and
   wherein multiple groups of circumferential corrugations are formed on a radially central portion of the core disk while being spaced apart from each other group, and a group of radial corrugations are formed at a position between each two neighboring circumferential corrugation groups.

2. A diamond cutting wheel, comprising:
   a core disk;
   a sintered cutting tip fitted around and welded to a circumferential end of the core disk; and
   a plurality of depressions formed on upper and lower cutting surfaces of the cutting tip while being spaced apart from one another, the depressions formed on the upper cutting surface alternating with the depressions formed on the lower cutting surface so as to allow the cutting surfaces to be continued,
   wherein multiple groups of circumferential corrugations are formed on a radially central portion of the core disk while being spaced apart from each other group, and a group of radial corrugations are formed at a position between each two neighboring circumferential corrugation groups.

\* \* \* \* \*